United States Patent [19]

Sharp

[11] Patent Number: 5,136,877

[45] Date of Patent: * Aug. 11, 1992

[54] STORAGE TANK SYSTEMS WITH AUXILIARY ENCLOSURE ASSEMBLY

[76] Inventor: Bruce R. Sharp, 22375 Edgewater Dr., Unit 241, Charlotte Harbor, Fla. 33980

[*] Notice: The portion of the term of this patent subsequent to Oct. 1, 2008, has been disclaimed.

[21] Appl. No.: 678,113

[22] Filed: Apr. 1, 1991

Related U.S. Application Data

[63] Continuation-in-part of Ser. No. 504,124, Apr. 3, 1990, Pat. No. 5,052,216, which is a continuation-in-part of Ser. No. 450,820, Dec. 14, 1989, Pat. No. 5,052,217, which is a continuation-in-part of Ser. No. 281,816, Dec. 8, 1988, Pat. No. 4,912,966, which is a continuation-in-part of Ser. No. 66,691, Jun. 26, 1987, abandoned.

[51] Int. Cl.⁵ ............................................. G01M 3/32
[52] U.S. Cl. ...................................... 73/49.2; 220/86.1
[58] Field of Search ................. 73/49.2; 220/DIG. 5, 220/85 S, 85 VR, 85 VS, 1 B, 18, 5 A; 137/312

[56] References Cited

U.S. PATENT DOCUMENTS

| 1,156,469 | 10/1915 | Dodge | 220/85 S |
|---|---|---|---|
| 4,527,708 | 7/1985 | Dundas et al. | 220/85 S X |
| 4,637,522 | 1/1987 | Klop | 220/85 VR X |
| 4,639,164 | 1/1987 | Pugnale et al. | 220/1 B X |
| 4,653,312 | 3/1987 | Sharp | 73/49.2 |
| 4,655,361 | 4/1987 | Clover et al. | 220/18 X |
| 4,685,327 | 8/1987 | Sharp | 73/49.2 |
| 4,685,585 | 8/1987 | Robbins | 220/5 A X |
| 4,717,036 | 1/1988 | Dundas et al. | 220/85 S X |
| 4,884,709 | 12/1989 | McCarthy | 220/1 B X |
| 4,895,272 | 1/1990 | De Benedittis et al. | 220/85 S |

FOREIGN PATENT DOCUMENTS

| 755751 | 2/1971 | Belgium | 220/85 S |
|---|---|---|---|
| 763788 | 8/1971 | Belgium | 220/85 S |
| 2900960 | 7/1969 | Fed. Rep. of Germany | 73/49.2 |
| 1548526 | 10/1968 | France | 73/49.2 |
| 565999 | 8/1975 | Switzerland | 73/49.2 |

Primary Examiner—Hezron E. Williams
Assistant Examiner—Joseph W. Roskos
Attorney, Agent, or Firm—Charles R. Wilson

[57] ABSTRACT

A storage tank system especially useful for storing gasoline has an auxiliary enclosure assembly. The system comprises a storage tank, preferably with a tank cover for gaining ingress into the storage tank, a sleeve positioned on the storage tank, a sleeve cover with an entry cover in a mid-portion thereof, preferably a dirt shield extending from the sleeve cover to ground level, a drip sump compartment positioned on the cover of the sleeve and a fill line extending through the drip sump compartment and sleeve. The assembly allows ready access to the area within the sleeve for inspection and repair purposes and can provide ready access to the interior of the tank. It also provides protection and containment for access lines leading through it.

17 Claims, 2 Drawing Sheets

STORAGE TANK SYSTEMS WITH AUXILIARY ENCLOSURE ASSEMBLY

This application is a continuation-in-part of "Containment Means For Storage Tank Systems", Ser. No. 07/504,124, filed Apr. 3, 1990, now U.S. Pat. No. 5,052,216 which is a continuation-in-part of "Containment System For Fill Line Of Underground Storage Tank", Ser. No. 07/450,820 filed Dec. 14, 1989, now U.S. Pat. No. 5,052,217 which is a continuation-in-part of "Total Containment Means For Storage Tank Systems", Ser. No. 07/281,816, filed Dec. 8, 1988, now U.S. Pat. No. 4,912,966 which is a continuation-in-part of "Total Containment And Overfill Storage Tank System", Ser. No. 07/066,691, filed Jun. 26, 1987, now abandoned.

FIELD OF INVENTION

This invention relates to liquid storage tank systems. More particularly, the invention relates to storage tank systems having an auxiliary enclosure assembly for a tank entry way and access lines.

BACKGROUND OF THE INVENTION

Storage tanks are widely used for storing a variety of liquids. Some of these liquids are hazardous and can be corrosive and/or flammable. In particular, underground storage tanks are used extensively for the storage of liquid gasoline at retail gasoline stations. Typical underground storage tanks are constructed with structural accessories such as an entry way and access lines for filling, dispensing, and venting.

The entry way found on many underground storage tanks is either a cover bolted directly to the storage tank or is a manway built onto the storage tank with a cover on the manway. Either type of entry way is intended to permit ready access to the interior of the tank for inspection and repair purposes. With recent regulations requiring more frequent testing and inspection, it has become even more desirable to access the interior of the storage tank without having to excavate to the tank and dismantle all the access lines, pumps, etc. Manholes have been used to provide a direct route to a buried storage tank. However, access lines also need to be inspected and guarded against from leakage. All the access lines cannot fit within the manhole without creating a safety hazard and also creating a dismantling problem to access the entry way to the storage tank's interior. Moreover, the access lines require special containment and protection features mandated by law. The access lines described above are examples of structures through which liquids and vapors flow and all of which are normally located at the top of the tank.

The access line which has proved most troublesome to adequately ensure against spillage and leakage has been the line for periodically filling the storage tank. This line extends from ground surface to the underground storage tank. Spillage at ground surface level can occur when the line is accessed by a transport tank truck operator for filling of the storage tank. Extreme care must be taken so that minor drippings do not occur since even minor drippings from repeated fillings over a course of years can ultimately become excessive. Drip sumps around the ground surface level of the fill line have helped, but are not fully adequate.

Another problem experienced by the fill lines is that if made of steel, as is conventional, they tend to corrode from contact with surrounding soil. A drip sump which extended from ground surface to the storage tank would appear to solve the problems in that it would catch accidental drippings from the filling operation as well as protect the fill line from contact with the soil. However, a deep drip sump itself creates a problem in that debris which enters is difficult to remove because of the depth.

A large secondary containment area to encompasses all the access lines has been suggested. This would allow for better ingress to the area to reach the various fittings, remove debris, etc. However, any drippings such as from a filling operation which reach any such relatively large containment area, whether directly or indirectly, create a potentially dangerous situation. The drippings can vaporize and with the right vapor-oxygen ratio can explode if a spark or other ignition source is present such as from electrical equipment often contained at or near the storage tank's access lines. As can be appreciated, there are several requirements that must be considered in the designing of a containment system for access lines to an underground tank.

The service life of a storage tank system will vary, but eventually the tank and its access lines will leak. Leaks from the tank system often happen within a few years after the new tank and lines are installed, due to improper installation or flaws in the manufacturing of the tanks and lines. Leakage problems are particulary troublesome in that gasoline storage tanks are usually buried underground. Any leaks which develop are normally very slow initially and are very difficult to detect. Leaks from subterranean tanks or their accessories can result in a significant danger to the environment and health of nearby residents. Federal as well as local regulations govern the design and maintenance of such storage tanks.

There now has been discovered an assembly for enclosing a storage tank's entry way and other structural accessories which solves problems associated with many known manhole and containment systems. The present invention solves the problems inherent with existing tank systems. It is useful with new tank systems and as well as a retrofit to buried tank systems.

SUMMARY OF THE INVENTION

The present invention is concerned with underground storage tank systems. The system comprises (a) a storage tank having access lines into the tank and optionally an entry way, (b) a sleeve positioned on the tank to enclose any entry way and to form an area through which a fill line and other access lines pass, (c) a sleeve cover attached to the sleeve to form a sleeve area within the sleeve, further wherein said sleeve cover has a removable entry cover in a mid-portion thereof, (d) preferably, a dirt shield extending from the sleeve cover to ground surface to provide ready access to the entry cover, said dirt shield having a removal ground level cover, (e) a drip sump compartment positioned on the cover to the sleeve, said compartment having means for communication with the interior of the storage tank and (f) a fill line which extends through the drip sump compartment and the sleeve area. The fill line has one end terminating near a top of the drip sump compartment near ground surface for filling purposes and a second end opening directly into the storage tank's interior. The system allows ready access to the storage tank interior and all access lines. Additionally, the fill line is encompassed by the drip sump compartment and sleeve.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

Figure 1:
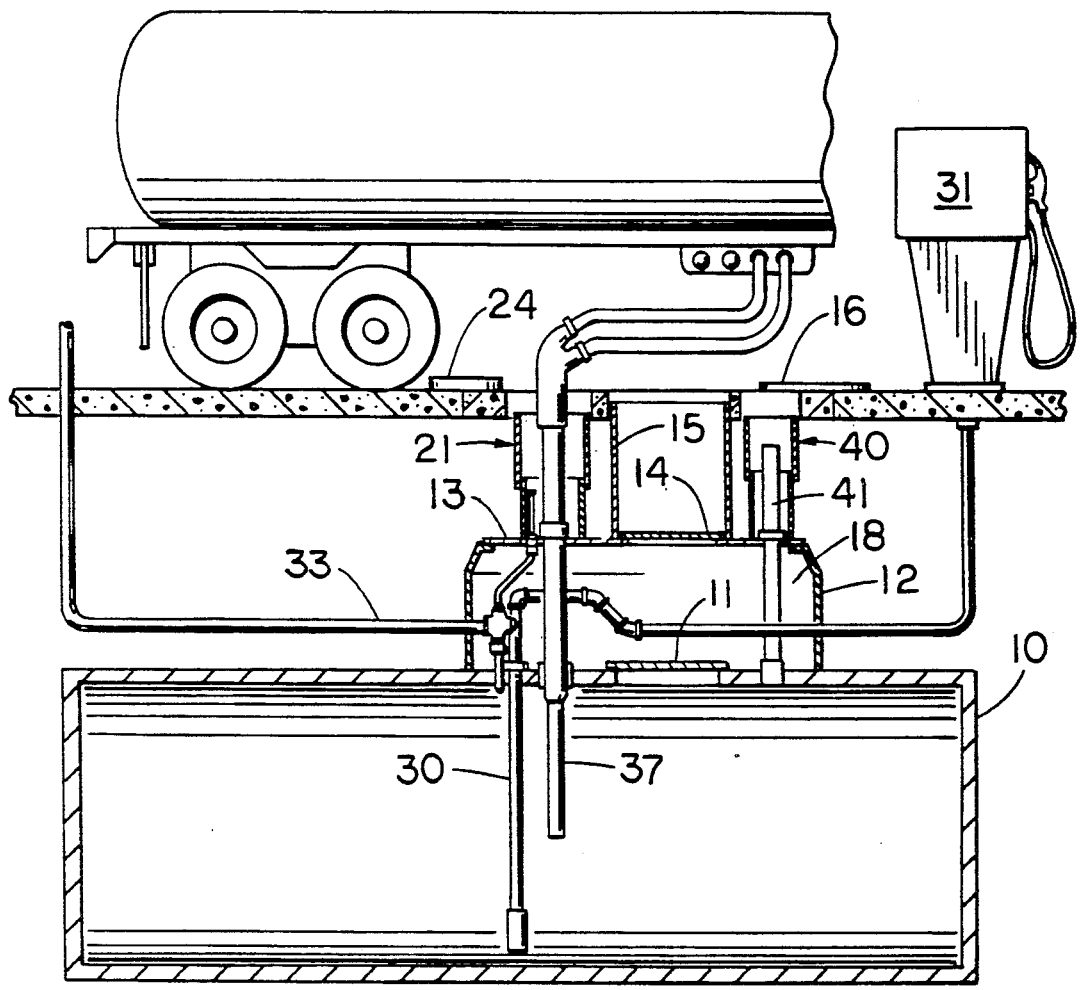
FIG. 1 is a side view, partially in section, of the storage tank system of this invention having an auxiliary enclosure assembly for an entry way and access lines.
Figure 2:
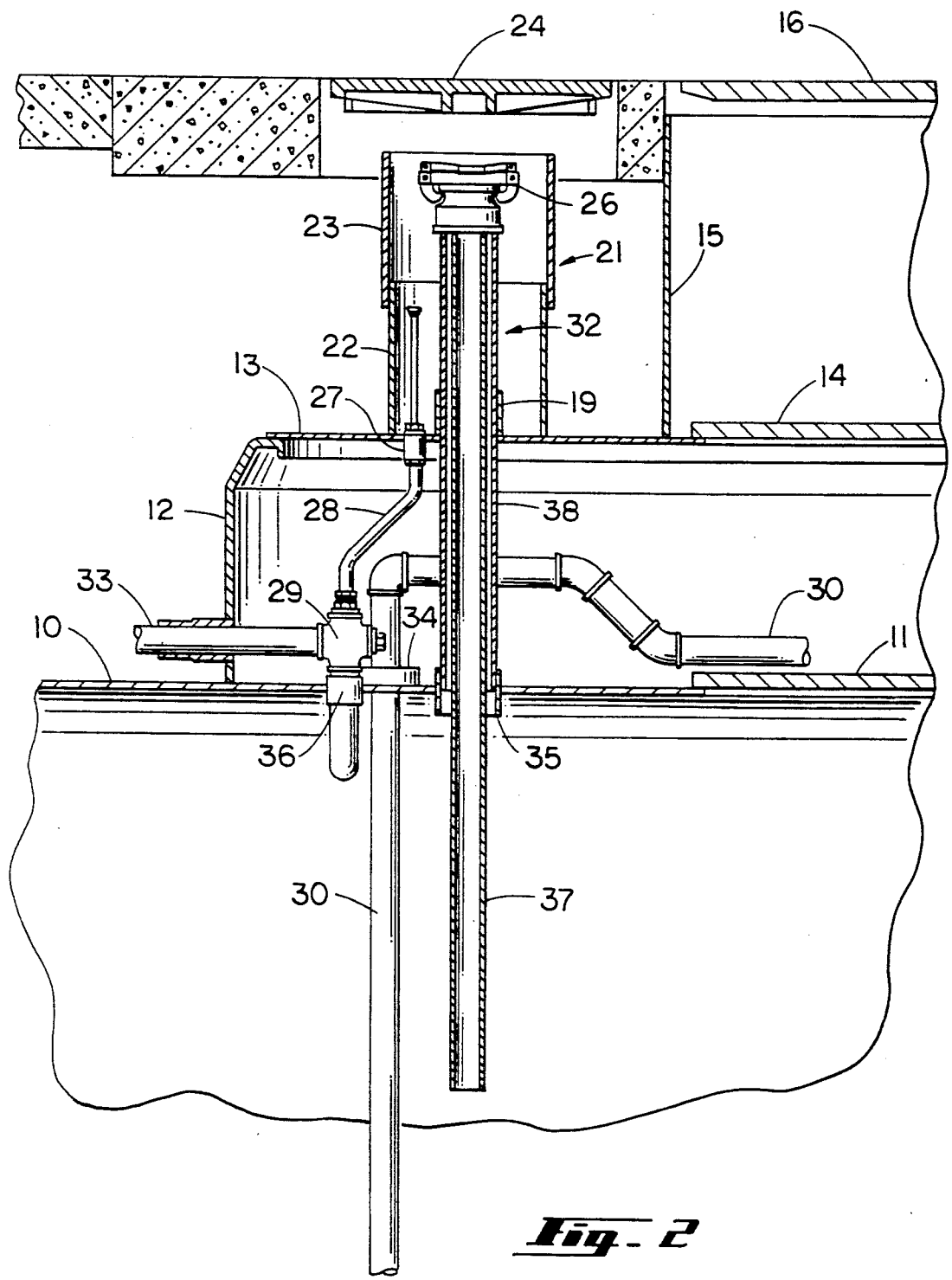
FIG. 2 is a cross-section view, partially in section of the storage tank system of FIG. 1.

With reference to FIGS. 1 and 2, the present invention utilizes a storage tank 10. The tank is made of metal such as steel. A fibrous reinforced resinous material e.g. a fiberglass reinforced polyester or vinylester material can also be used to form the tank. As shown, a tank cover 11 is securely attached to the storage tank. The tank cover is not required, though is preferred to serve as an entry way by which access can be gained to the interior of the tank. Removal of a cover after disconnecting any access line passing through the cover will allow an individual to enter the tank for repair or inspection purposes. The tank cover is generally cylindrical in shape and about one to three feet in diameter, though other shapes and dimensions can be utilized. The cover 11 is securely fastened to the tank 10, preferably in liquid tight fashion by known attachment means, e.g. bolts, nuts and gasket (not shown). The storage tank can be built without the tank cover and quite often is. In such a case, an opening must be cut into the tank within the sleeve for ingress to the storage tank interior. A tank cover is then usually used to seal up the opening.

Storage tanks with a manway as an entry way are commercially available and can also be used in this invention. The manway is built or permanently attached to the top of the storage tank. It is typically cylindrical-shaped with a diameter of about eighteen inches to about thirty-six inches. A manway cover is securely fastened to the top of the manway, preferably in a liquid tight fashion. The primary function of the manway is to serve as a means by which access can be gained to the interior of the storage tank.

In accord with the invention depicted in FIGS. 1 and 2, a sleeve 12 extends around the tank cover 11. The sleeve is preferably cylindrical in shape but can be other shapes as well and extends about twelve inches to about forty-eight inches, preferably about eighteen inches to about thirty inches, above the storage tank 10. The sleeve is positioned on a top surface of the storage tank. It is positioned so as to rest on the top surface and is preferably steadied by sleeve supports attached to the tank and the sleeve. The sleeve supports are brackets dimensioned to attach to the cylindrical-shaped tank 10 and the cylindrical-shaped sleeve 12. Preferably, each support is made of a similar material as the tank. Other sleeve supports of various natures can be used. For example, a ring properly dimensioned, can be attached to the storage tank and the sleeve slides into or over the ring and are secured together. The sleeve can as well rest on or near the top of the storage tank with back fill alone retaining it in place.

The sleeve 12 is positioned on the storage tank 10 in a non-liquid tight manner. As a result it is feasible to use the sleeve of this invention for retrofitting previously used buried storage tanks where a liquid tight fit is difficult to achieve. Preferred, however, is a liquid-tight seal between the sleeve and the storage tank. Such a seal adds a further feature to the invention in that a sleeve area 18 within the sleeve now becomes an effective secondary containment chamber to contain leaks from access lines passing through it. The sleeve facilitates access to the interior of the storage tank for inspection and repair purposes. It also provides a convenient location for a submerged pump used in dispensing gasoline from the storage tank. The pump is readily installed and removed for repair or maintenance purposes without a need to enter the storage tank.

A sleeve cover 13 rests on the sleeve to form the sleeve area 18 within the sleeve. The cover is preferably held in a liquid tight relationship to the sleeve. A gasket together with bolts and nuts are used for this purpose. The sleeve cover can also be permanently attached to the sleeve or be an integral part thereof.

An entry cover is provided in a mid-portion of the sleeve cover. The entry cover 14 is to gain access to the entry way of the storage tank. As evident in FIG. 2 the entry cover 14 is positioned above the tank cover 11 for obvious reasons. It is intended to be readily removed. Accordingly, a recessed lip is provided in the sleeve cover to receive the entry cover. Extending from the sleeve cover 13 to ground level is an optional dirt shield 15. The shield is dimensioned to enclose the entry cover and merely ensures that access is readily provided from ground surface to the entry cover 14, tank cover 11 and ultimately the interior of the storage tank 10. The dirt shield is preferably attached by brackets to the sleeve cover to steady it, though can be initially positioned where needed and back fill added to retain it in place for its intended function. A ground level manhole cover 16 is positioned over the dirt shield. It should be apparent that access can be gained to the entry cover 14 when the dirt shield is not present by excavating to it. However, the dirt shield adds to the attractiveness of the invention and is highly preferred.

A drip sump compartment 21 for catching spills during a filling operation is positioned on the sleeve cover 13. Liquid capacity of the sump area within the compartment 21 is approximately one to twenty-two gallons, preferably about three to about six gallons. The area within the compartment is not intended for overfill purposes, but rather is used as a spill or drippings catcher. The problem with using the sump area as a overfill area is that it is not doubled walled and is lacking in capacity. The sump area is used to collect any spills or drippings that may result from a loose connection and/or during disconnecting of a flexible delivery hose leading from a transport tank truck to the fill line as discussed below.

The drip sump compartment 21 has a lower cylinder 22, preferably immovably attached and preferably attached in a liquid tight manner, to the sleeve cover 13. The lower cylinder 22 has secured to it an adjustable slide height upper cylinder 23 which can be moved so that its top rim is near the under surface of a conventionally used ground level surface cover 24. The preferred height of the lower and upper cylinders as measured from the sleeve cover 14 is about one to fifteen inches, but not exceeding about thirty-six inches. The diameter of the compartment 21 is about nine inches to about fifteen inches. When the preferred height is adjusted to be in proper proximity to the surface manhole cover, cylinders 22 and 23 are sealed together. Sealing methods such as gluing, welding, or band clamping are various known methods which can be used. One piece drip sump compartments are also usable in the invention provided they are properly dimensioned.

An optional cover cap is provided over the adjustable slide height cylinder 23 to keep the interior sump area free of dirt and water. Other means as well can be used to ensure that the drip sump compartment area remains free of debris. For example, the upper cylinder 23 of the drip sump compartment could extend to the fill cover 24 and possibly be connected thereto in a fashion which does not hinder access to the fill line during a filling operation. A fill line cap 26 is provided on the fill line to seal off the tank's interior.

A sump drain valve 27 is used to drain any spills or drippings caught within the drip sump compartment 21 back to the storage tank 10. The valve is securely fastened and preferably sealed to the cover 13. Upon opening the valve the liquids are drained through a drain hose 28 into the top of a T-vent 29, which is in communication with the interior of the storage tank 10 through the vent line. The drain hose can as well be connected directly to the storage tank or the manway cover.

Passing through the sleeve and then the storage tank are various access lines typically associated with underground storage tanks. 2 As seen in FIGS. 1 and 2, a dispensing line 30 leads to a ground level gasoline dispenser 31, a fill line 32 leads to a capped opening within the drip sump compartment 21 at or near the ground surface and a vent pipe 33 leads to the atmosphere. As evident in FIG. 2, they are secured to the storage tank by double threaded bushings 34, 35, and 36, respectively. The aforementioned access lines are secured directly to the top surface of the tank within the sleeve area.

The fill line 32 a shown is a coaxial fill line comprised of an inner fill pipe 37 and a concentric outer vapor recovery tube 38. The fill pipe extends into the storage tank with an opening near the tank's bottom surface to minimize splashing and consequent vapor formation during the filling operation. The vapor recovery tube 38 has one opening at the tank's top surface. A second opening is at the upper or fill end of the fill line. Its purpose is to receive vapors from the filling operation and direct them back to a return line leading to the transport tank truck.

A second drip sump compartment 40 can optionally be positioned on the sleeve cover. The second compartment together with a surface cover (not shown) is used to encase another pipe, e.g. the dispensing line or the vapor recovery tube of a two point fill system to ensure primary containment of such lines. It should be apparent as well that all lines could alternatively pass through a single drip sump compartment.

It should be apparent that much of the storage tank's accessories are encompassed by the sleeve 12. The tank's access lines are at least partially encompassed by the sleeve 12 while the fill line 32 is fully encompassed by the drip sump compartment 21 and the sleeve 12. Any accidental spills during a filling operation will be caught by the drip sump compartment and directed to the storage tank. Further, it should be evident that the fill line is completely protected from contact with the surrounding earth and therefore needs no cathodic protection.

A double wall storage tank can be used in this invention. The outer wall acts as a secondary containment means in case of leakage through the inner wall. The sleeve is attached to an outer wall of a double wall tank system or can be attached to the inner tank with the outer wall attached to it in a liquid tight fashion. The outer wall is constructed of a material of sufficient strength to contain the stored gasoline in case of a leak. The outer wall can be made of a thin gauge steel or a synthetic polymeric material, including an elastomeric material such as rubber, e.g. Buta-N, neoprene, fluoroelastomer, e.g. Viton, polyester, vinyl esters, polyethylene (preferably a high density polyethylene), polypropylene, polyvinylchloride, polyurethane, polyepoxie and can contain various fiber reinforcing materials, fabric and vinyl backed sheets of any of the foregoing materials as well as materials constructed of two or more of the foregoing materials, e.g. fluoroelastomer coated polyethylene. Fiberglass reinforced polyesters and vinyl esters are two preferred wall materials. The listed materials used in construction of the outer wall are not all inclusive, but only illustrative of some of the materials that can be used. Preferably, the outer wall is made of at least one material which is gasoline impervious.

Leak detection means are preferably used in the sleeve space of the storage tank systems of the invention to monitor for leakage through the fill line. Several different types of detection means can be used, including pressure change detectors, gas or liquid analyzers, and electronic probes. The detection means itself is preferably positioned within the sleeve area for ready accessibility. The detection means can be periodically checked or it can be electronically connected to a remote receiving station for continuous monitoring. Additionally, a second leak detection means leading to the closed space between the inner tank and outer wall of the double wall tank systems samples that space for leakage. Optionally, a sampling pipeline can extend completely to the bottom of the closed space where leaked liquid is likely to drain. These pipelines can follow the contour of the inner tank's outer wall or pass directly through the inner tank's storage area and bottom surface. Liquid tight fittings, of course, are required with the direct pipelines.

A preferred leak detection means in the double wall tank systems utilizes non-atmospheric air pressure throughout the closed space. Such detection means associated with the closed space between the inner tank and outer wall is capable of detecting any change in pressure resulting from a leak in the inner tank or outer wall. Conventional air pressure or a vacuum means is used for providing a positive or negative pressure. The use of air pressure with a flexible outer wall is not preferred because the wall may be gas permeable to a certain degree and loss of pressure because of this must be compensated for. When a vacuum is used, reinforcing means are used to maintain a spaced relationship between the tank and outer wall. A gas pervious material, for example a continuous foraminous or porous matting is placed within the closed annular space to maintain the spaced relationship. Jute, polyurethane foam, fiberglass matting, cotton matting, nylon matting and asbestos are examples of materials which can be used. A line leads from the non-atmospheric air pressure means to a gauge conveniently positioned, e.g. in an attendant's area for periodic checking.

Other leak detection means, e.g. a probe positioned within the sleeve area or any closed space can be used. The probe is capable of detecting preselected liquids, e.g. gasoline. Various probes are known. In one type, electric wires are encased in a gasoline-soluble covering. Leaked gasoline into the sleeve area or closed space will eventually dissolve the covering and cause a current in the wires to short circuit.

It should be apparent that variations of the invention described herein are possible. For example, storage tanks with manways built on a top surface are very common. This type of tank is adaptable with the auxiliary enclosure assembly described. All such variations are within the scope of the claims.

What is claimed is:

1. A storage tank system having an auxiliary enclosure assembly for an entry way to the tank and access lines leading to the tank, said system comprised of:
   (a) a storage tank for storing liquid, said storage tank having access lines into the tank;
   (b) a sleeve positioned on the storage tank to enclose the access lines, said sleeve positioned so as to keep a sleeve area therewithin substantially free of surrounding soil;
   (c) a sleeve cover attached to the sleeve to form the sleeve area therewithin, further said sleeve cover having a removable entry cover in a mid-portion thereof so as to gain access to the access lines;
   (d) a drip sump compartment positioned on the sleeve cover of the sleeve, said drip sump compartment capable of catching spills and drippings during a filling operation; and
   (e) a fill line for adding liquid to the tank which extends through the drip sump compartment and sleeve area, said fill line having an opening at one end within the drip sump compartment for receiving liquid during a filling operation and a second opening at another end which leads directly to the interior of the storage tank.

2. The storage tank system of claim 1 wherein the storage tank has an entry way for gaining entry to the tank's interior for inspection and repair purposes.

3. The storage tank of claim 2 wherein the entry way is a tank cover attached directly on the storage tank.

4. The storage tank system of claim 2 wherein the entry way of the storage tank is a manway with a manway cover.

5. The storage tank system of claim 1 wherein the sleeve extends from about twelve inches to about forty-eight inches above the top of the manway.

6. The storage tank system of claim 1 further having a dirt shield extending from the sleeve cover to a manhole cover at surface level to provide access to the entry cover for convenient entry therethrough.

7. The storage tank system of claim 1 wherein the sleeve on the storage tank is attached in a non-liquid tight manner.

8. The storage tank system of claim 7 further wherein the sleeve cover is held in a liquid tight manner to the sleeve.

9. The storage tank system of claim 8 wherein the sleeve cover is an integral part of the sleeve.

10. The storage tank system of claim 1 wherein the sleeve on the storage tank is attached in a liquid tight manner.

11. The storage tank system of claim 8 further wherein a drain valve is positioned in the drip sump compartment to control flow of liquid from said compartment to a drain line which leads to the storage tank's interior.

12. The storage tank system of claim 11 wherein the drip sump compartment is comprised of a lower cylinder secured to the sleeve's cover and an upper slide height cylinder and means to secure said cylinders together when properly adjusted.

13. The storage tank system of claim 1 wherein the fill line is a coaxial fill line comprised of a fill pipe which extends into the storage tank and an outer concentric vapor recovery tube which extends to the top surface of the storage tank.

14. The storage tank system of claim 1 further comprising an outer wall encasing the storage tank.

15. The storage tank system of claim 14 wherein the outer wall is made of a fibrous reinforced resinous material.

16. The storage tank system of claim 1 further wherein a dispensing line and a vent line for the storage tank pass through the sleeve area and into the storage tank within the sleeve area.

17. The storage tank system of claim 1 further having at least a second sump compartment positioned on the sleeve cover of the sleeve and an access line extending therefrom to the storage tank.

* * * * *